(12) United States Patent
Hwang et al.

(10) Patent No.: US 9,142,859 B2
(45) Date of Patent: Sep. 22, 2015

(54) POLYMER-SILICON COMPOSITE PARTICLES, METHOD OF MAKING THE SAME, AND ANODE AND LITHIUM SECONDARY BATTERY INCLUDING THE SAME

(75) Inventors: Sun Jung Hwang, Daejeon (KR); Dong Seok Shin, Seoul (KR); Yoon Kyung Kwon, Daejeon (KR); Geun Chang Chung, Daejeon (KR); Jung Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/180,007

(22) Filed: Jul. 11, 2011

(65) Prior Publication Data

US 2012/0007028 A1 Jan. 12, 2012

Related U.S. Application Data

(63) Continuation of application No. PCT/KR2011/001725, filed on Mar. 11, 2011.

(30) Foreign Application Priority Data

Mar. 11, 2010 (KR) .................. 10-2010-0021762

(51) Int. Cl.
- *B32B 3/00* (2006.01)
- *H01M 10/0525* (2010.01)
- *H01M 4/134* (2010.01)
- *H01M 4/1395* (2010.01)
- *H01M 4/36* (2006.01)
- *H01M 4/38* (2006.01)
- *H01B 1/24* (2006.01)
- *H01M 4/62* (2006.01)

(52) U.S. Cl.
CPC ............. *H01M 10/0525* (2013.01); *H01B 1/24* (2013.01); *H01M 4/134* (2013.01); *H01M 4/1395* (2013.01); *H01M 4/366* (2013.01); *H01M 4/386* (2013.01); *H01M 4/628* (2013.01); *H01M 4/625* (2013.01); *H01M 4/626* (2013.01); *Y02E 60/122* (2013.01)

(58) Field of Classification Search
CPC ........... H01B 1/24; B05D 7/00; H01M 4/134; H01M 4/0438; C04B 35/80
USPC ......... 429/218.1, 231.95, 245, 217, 201, 314, 429/303; 428/313.9
See application file for complete search history.

(56) References Cited

U.S. PATENT DOCUMENTS

| | | | | |
|---|---|---|---|---|
| 6,372,388 B1 * | 4/2002 | Katsurao et al. | ............. | 429/316 |
| 6,485,831 B1 * | 11/2002 | Fukushima et al. | ........... | 428/403 |
| 2004/0041131 A1 | 3/2004 | Fukushima et al. | | |
| 2004/0058240 A1 | 3/2004 | Christensen | | |
| 2004/0062991 A1 * | 4/2004 | Fukui et al. | ................. | 429/218.1 |
| 2004/0072067 A1 | 4/2004 | Minami et al. | | |
| 2004/0106040 A1 | 6/2004 | Fukuoka et al. | | |
| 2006/0127773 A1 * | 6/2006 | Kawakami et al. | ........... | 429/245 |
| 2007/0287070 A1 * | 12/2007 | Okumura et al. | ............. | 429/317 |
| 2008/0090152 A1 | 4/2008 | Kosuzu et al. | | |
| 2008/0166474 A1 | 7/2008 | Deguchi et al. | | |
| 2008/0236909 A1 | 10/2008 | Morita et al. | | |
| 2009/0023065 A1 | 1/2009 | Hwang et al. | | |
| 2010/0055563 A1 | 3/2010 | Nakanishi et al. | | |

FOREIGN PATENT DOCUMENTS

| | | |
|---|---|---|
| CN | 1682393 A | 10/2005 |
| CN | 101210112 A | 7/2008 |
| JP | H04285693 A | 10/1992 |
| JP | 2000-036323 A | 2/2000 |
| JP | 2004-178917 A | 6/2004 |
| JP | 2004228059 A | 8/2004 |
| JP | 2006-196338 A | 7/2006 |
| JP | 2007-165061 A | 6/2007 |
| JP | 2008-117761 A | 5/2008 |
| JP | 2008112710 A | 5/2008 |
| JP | 2008-243822 A | 10/2008 |
| JP | 2008243674 A | 10/2008 |
| JP | 2009-026760 A | 2/2009 |
| JP | 2011057541 A | 3/2011 |
| KR | 20020070763 A | 9/2002 |
| KR | 20040047621 A | 6/2004 |
| KR | 20070059717 A | 6/2007 |
| KR | 20070093042 A | 9/2007 |
| KR | 20090058505 A | 6/2009 |
| KR | 20100024903 A | 3/2010 |
| WO | 2008018214 A1 | 2/2008 |

OTHER PUBLICATIONS

Hyun-Shil La et al., "Preparation of polypyrrole-coated silicon nanoparticles", Colloids and Surfaces A: Physicochem. Eng. Aspects 272 (2006) 22-26.

* cited by examiner

Primary Examiner — Monique Peets

(74) Attorney, Agent, or Firm — Lerner, David, Littenberg, Krumholz & Mentlik, LLP

(57) ABSTRACT

The present invention relates to polymer-silicon composite particles using silicon having high energy density, a method of making the same, an anode and a lithium secondary battery including the same. The silicon having high energy density is used as an anode active material to provide a lithium secondary battery having large capacity. Silicon-polymer composite particles having a metal plated on the surface thereof are provided to solve the problem that silicon has low electrical conductivity and a method of preparing the same is provided to produce an electrode having improved electrical conductivity. Furthermore, silicon-polymer composite particles having a metal coated on the surface thereof through electroless plating are prepared and an electrode is formed using the silicon-polymer composite particles.

9 Claims, 2 Drawing Sheets

POLYMER-SILICON COMPOSITE PARTICLES, METHOD OF MAKING THE SAME, AND ANODE AND LITHIUM SECONDARY BATTERY INCLUDING THE SAME

CROSS-REFERENCE TO RELATED APPLICATIONS

This application is a Continuation of PCT International Application No. PCT/KR2011/001725 filed on Mar. 11, 2011, which claims the benefit of Patent Application No. 10-2010-0021762 filed in Republic of Korea, on Mar. 11, 2010. The entire contents of all of the above applications is hereby incorporated by reference into the present application.

BACKGROUND OF THE INVENTION

The present invention relates to polymer-silicon composite particles and an anode and a lithium secondary battery including the same.

DISCUSSION OF THE RELATED ART

A lithium secondary battery is widely used as a power supply of electronic devices such as cellar phones, notebook computers and digital cameras because the lithium secondary battery is light and has high voltage and large capacity as compared to a nickel-hydride battery. Development of electric vehicles that attract growing attention due to the trend toward reducing the sizes and weights of portable electronic devices and increasing battery life time for convenient use the portable electronic devices, exhaustion of oil resources and environment pollution strongly requires high energy density of secondary batteries used as energy storage devices of the portable electronic devices.

To increase the capacity of the lithium secondary battery, an active material capable of storing a large quantity of lithium ion and emitting the lithium ion is required. Since the capacity of carbon currently used as an anode active material already reached the theoretical limit capacity (372 mAh/g in case of graphite), it is difficult to further increase the capacity of carbon. Accordingly, introduction of new materials is required and silicon having the theoretical capacity of approximately 4,200 mAh/g is attracting attention as one of new materials replacing carbon.

When silicon is used as the anode active material of the lithium secondary battery, low electrical conductivity of silicon becomes a problem although it can be expected to obtain a lithium secondary battery having large charging/discharging capacity.

Electrical conductivity is a property that must be basically satisfied in the case of electrode materials of batteries and is an essential factor for smooth generation of charge transfer reaction occurring during intercalation/elimination of lithium.

To improve the electrical conductivity of electrodes, a method of doping a conductive metal to the surface of an anode active material to facilitate movement of electrons was proposed. However, this method is difficult to improve the internal conductivity of an active material having low conductivity, such as silicon composite, although it can increase the conductivity of the surface of the active material.

Meantime, Korean Patent No. 2007-0093042 discloses a method of uniformly electroless-depositing copper on the surface of silicon powder to prevent deterioration of electrodes due to low conductivity of silicon powder and volume expansion. However, this method cannot be considered to recommend a satisfactory solution to volume expansion and contraction caused by repeated insertion and elimination of lithium ion during charging/discharging processes of batteries although the method improves electrical conductivity to some degree.

BRIEF SUMMARY OF THE INVENTION

Upon the consideration of improvements for the aforementioned problems, the inventors discovered that problems of deterioration of an electrode caused by a remarkable volume variation in an anode active material including silicon and low electrical conductivity of silicon can be solved by coating a predetermined quantity of metal on the surface of particles through electroless plating to prepare polymer-silicon composite particles and forming the electrode using the polymer-silicon composite particles and reached the present invention An aspect of the present invention is to provide polymer-silicon composite particles including a metal coating layer formed on the surface thereof, a method of making the same, an anode formed using the polymer-silicon composite particles, and a lithium secondary battery including the anode.

To achieve the above aspect, there is provided polymer-silicon composite particles including silicon particles dispersed in a polymer matrix and a metal coating layer formed on the surface thereof.

The polymer-silicon composite particles may further include conductive fiber and carbon black.

The conductive fiber may be carbon nanotube.

The polymer matrix may correspond to one of more materials selected from the group consisting of polypyrrole, polyaniline and polythiophene.

An organic silane compound may be coupled to the surface of the silicon particles.

The organic silane compound may correspond to at least one silane compound selected from a group consisting of dimethyldimethoxysilane, dimethyldiethoxysilane, methyltrimethoxysilane, vinyltrimethoxysilane, phenyltrimethoxysilane, and tetraethoxysilane.

The metal coating layer may be formed of at least one metal selected from a group consisting of Ni, Au, Ag, Cu, Zn, Cr, Al, Co, Sn, Pt and Pd.

The thickness of the metal coating layer may be in the range of 10 to 300 nm.

To achieve the above aspect, there is also provided an anode for lithium secondary batteries, which includes the polymer-silicon composite particles according to one of claims 1 through 8.

The anode for lithium secondary batteries may further include amorphous carbon or crystalline carbon.

To achieve the above aspect, there is also provided a lithium secondary battery comprising the anode.

To achieve the above aspect, there is also provided a method of making polymer-silicon composite particles, which comprises a first step of mixing a monomer compound forming a polymer matrix and silicon particles and polymerizing the mixture to prepare polymer-silicon composite particles; and a second step of forming a metal coating layer on the surface of the polymer-silicon composite particles.

The first step may polymerize the mixture through suspension polymerization.

The monomer compound may include at least one monomer selected from the group consisting of aromatic vinyl, acrylate, metacylate, diene and olefin monomers; and at least one conductive additive selected from the group consisting of graphite such as natural graphite or synthetic graphite, carbon black such as acetylene black, Ketjen black, channel black, furnace black, lamp black and summer black, a conductive fiber such as carbon fiber, carbon nanotube and metal fiber; conductive metal oxide such as titan oxide; and polyphenylene derivative.

The second step may form a single metal coating layer or hybrid metal coating layer using at least one metal selected from a group consisting of Ni, Au, Ag, Cu, Zn, Cr, Al, Co, Sn, Pt and Pd.

The second step may form the metal coating layer using electroless plating.

The second step may deposit Pd catalyst on the surface of the polymer-silicon composite particles polymerized in the first step and then forms the metal coating layer.

The present invention can provide a large-capacity lithium secondary battery, enhance the electrical conductivity of the electrode of the battery and improve deterioration of the battery due to an electrode volume variation generated when the battery is used by using the polymer-silicon composite having a metal coating layer formed on the surface thereof as an anode active material.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The present invention provides polymer-silicon composite particles including a metal coating layer formed on the surface thereof, a method of making the same, an anode for a lithium secondary battery using the polymer-silicon composite particles, and a lithium secondary battery including the anode.

The polymer-silicon composite particles according to the present invention has the metal coating film formed on the surface thereof through electroless plating to provide an anode and a lithium secondary battery having improved electrical conductivity.

Furthermore, the polymer-silicon composite particles relieve a volume variation in silicon particles, generated during a process of absorbing and emitting lithium ions, and stress caused by the volume variation due to free volume between polymer chains constructing the polymer matrix, and thus the structural stability of the polymer-silicon composite and the electrode including the same can be improved.

Moreover, the polymer matrix is deformed according to the volume variation in the silicon particles, generated during lithium charging and discharging processes, due to flexibility of the polymer chains to easily maintain the interface between the polymer matrix and the silicon particles. The stability of the Interface between the polymer matrix and the silicon particles can be reinforced by coupling the surfaces of the silicon particles with an organic silane compound to form chemical coupling between the silicon particles and polymer chains.

Here, the silane compound is not limited to specific compounds. For example, dimethyldimethoxysilane, dimethyldiethoxysilane, methyltrimethoxysilane, vinyltrimethoxysilane, phenyltrimethoxysilane, and tetraethoxysilane can be used as the silane compound.

The polymer-silicon composite particles, a method of forming an anode active material including the same, an anode and a lithium secondary battery using the polymer-silicon composite particles according to the present invention will now be explained in detail.

Preparation of Polymer-Silicon Composite Particles

Figure 1:
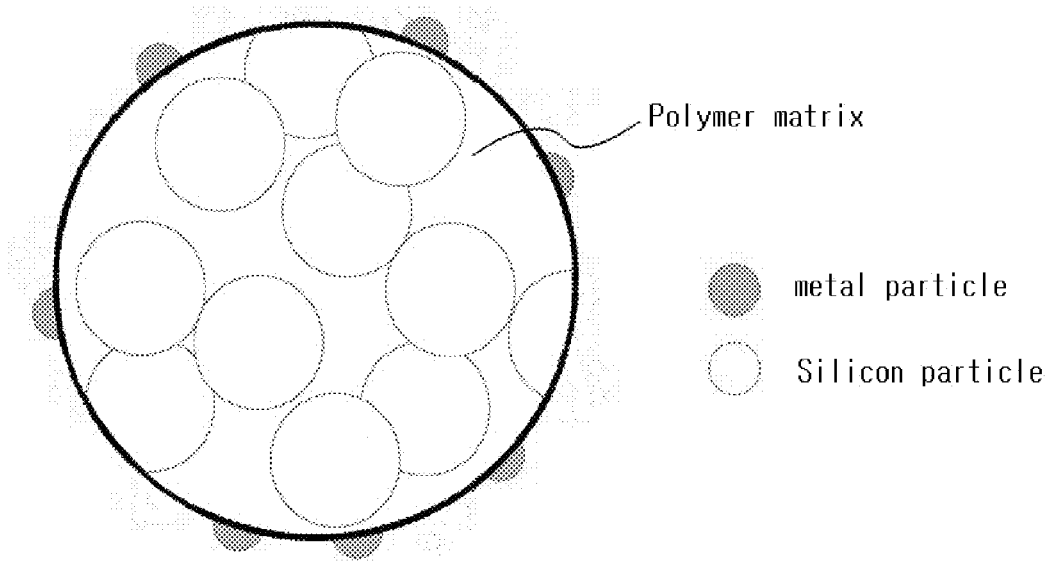
FIG. 1 is a cross-sectional view of a polymer-silicon composite particle according to the present invention.

FIG. 1 is a cross-sectional view of a polymer-silicon composite particle according to an embodiment of the present invention.

The polymer-silicon composite particle is prepared by mixing a monomer that can be polymerized, silicon particles and other additives and polymerizing the mixture through emulsion polymerization or suspension polymerization. It is desirable to use the suspension polymerization having a simple process and easily controlling a particle size.

The suspension polymerization includes a step (1) of mixing silicon particles, a monomer and other additives to prepare a monomer mixture, a step (2) of putting the monomer mixture into an aqueous solution containing a dispersing agent to obtain aqueous dispersions, applying shearing force to the aqueous dispersions including the monomer mixture and polymerizing the aqueous dispersions, and a step (3) of cleaning and collecting polymer-silicon composite obtained through polymerization.

As described above, ingredients used to prepare the polymer-silicon composite particles through suspension polymerization include the silicon particles having lithium charging/discharging activation, the monomer polymerized to form the polymer matrix, a polymerization initiator for promoting the polymerization of the monomer, and a conductive additive for improving the conductivity of the polymer-silicon composite. If required, the ingredients may further include a cross-linking agent for forming polymer chains in a network structure to improve the structural stability of the polymer-silicon composite particles, a coupling agent for increasing adhesion between the silicon particles and the polymer matrix, and a chain transfer agent for controlling the degree of polymerization of the polymer matrix.

The respective ingredients will now be explained in detail.

The silicon particles can use both crystalline particles and amorphous particles and particles having low crystallinity are advantageous to decrease initial volume expansion. Silicon particles having a mean diameter in the range of 1 nm to 5 μm are suitable for the polymer-silicon composite. It is desirable to use silicon particles having a mean diameter of smaller than 500 nm and it is more desirable to use silicon particles having a mean diameter of smaller than 200 nm When the silicon particles have a mean diameter of less than 500 nm, the silicon particles may crack during a charging/discharging process. Thus, it is desirable to use silicon particles having a diameter in the above range.

It is desirable that the silicon particles of 50 wt % to 80 wt % in content are included in the polymer-silicon composite particles.

It is difficult to increase the capacity of the lithium secondary battery including the polymer-silicon composite particles as an anode activation material when the polymer-silicon composite particles include silicon particles of less than 50 wt % in content and it is difficult to form a silicon-polymer composite when the content of the silicon particles in the polymer-silicon composite particles exceeds 80 wt %.

The monomer used in the present invention is polymerized to form the polymer matrix, and thus the monomer is required to be polymerizable through polymerization. Examples of monomers that can be polymerized through polymerization include aromatic vinyl, acrylate, metacylate, diene, olefin monomers, and at least one of these materials can be selected and used.

The monomer of 20 wt % to 50 wt % in content is included in the polymer-silicon composite particles.

It is difficult to form a conductive path in the polymer-silicon composite particles if the weight percent of the monomer exceeds 50 wt % and it is difficult to form the composite particles so that volume expansion caused by charging/discharging of silicon particles cannot be easily controlled if the content of the monomer is less than 20 wt %.

When polymerization is performed using the monomer, the polymer-silicon composite particles can include the polymer matrix such as polypyrrole, polyaniline or polythiophene in the polymer-silicon composite particles.

Figure 2:
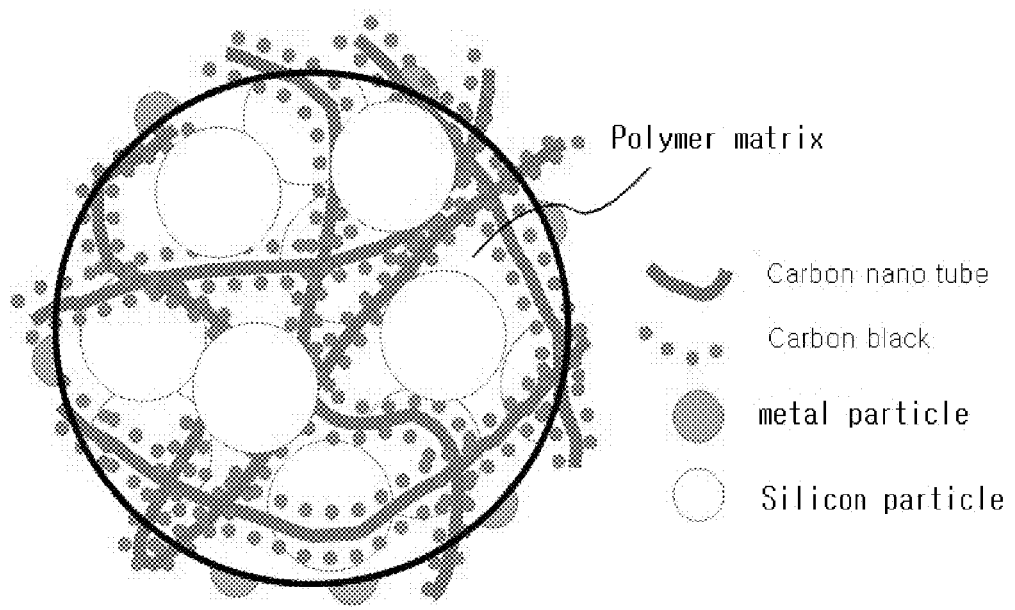
FIG. 2 is a cross-sectional view of a polymer-silicon composite particle including a conductive fiber and carbon black.

The conductive additive used in the present invention can be additionally dispersed in the polymer-silicon composite particles to make up for low conductivity of the silicon particles. The conductive additive can be added to the silicon-polymer composite particles if the silicon-polymer composite particles are not coated with carbon. FIG. 2 is a cross-sectional view of a polymer-silicon composite particle containing carbon nanotube and carbon black according to an embodiment of the present invention.

The conductive additive used in the present invention is not limited to specific additives. Any additive having conductivity without causing a chemical variation in the battery can be used as the conductive additive.

Specifically, conductive materials such as graphite such as natural graphite or synthetic graphite; carbon black such as acetylene black, Ketjen black, channel black, furnace black, lamp black, and summer black; conductive fiber such as carbon fiber, carbon nanotube, and metal fiber; conductive metal oxide such as titan oxide; and polyphenylene derivative can be used.

It is desirable to use the conductive fiber and carbon black together. The conductive fiber helps electrical connection of silicon particles and, at the same time, facilitates electrical connection of the inside and outside of the composite. It is more desirable to use carbon nanotube. The carbon black added with the conductive fiber is dispersed in the polymer matrix to improve electrical conductivity. The addition of the conductive fiber and carbon black to the polymer-silicon composite particles can increase the internal electrical conductivity as well as external electrical conductivity of the polymer-silicon composite particles to thereby provide an anode for lithium secondary batteries, which has high electrical property.

The aforementioned materials are mixed to prepare the polymer-silicon composite through emulsion polymerization or suspension polymerization. It is desirable that the polymer-silicon composite prepared through this method has a mean diameter in the range of 5 to 50 µm since it is difficult to form an electrode if the mean diameter of the composite is deviated from the above range.

Formation of Metal Coating Layer

The polymer-silicon composite particles have a metal coating layer formed on the surface thereof. It is desirable to form the metal coating layer using electroless plating.

The metal coating layer may be formed of at least one metal selected from a group consisting of Cu, Ni, Au, Ag, Zn, Cr, Al, Co, Sn, Pt and Pd.

Pd catalyst particles functioning as a catalyst of electroless plating reaction are deposited on the surface of the polymer-silicon composite particles to perform electroless plating on the surface of the polymer-silicon composite particles. To achieve this, the polymer-silicon composite particles are precipitated in a mixed solution of $PdCl_2$, HCl and water for several minutes, and then particles are separated through centrifugation to obtain composite particles having Pd particles deposited on the surface thereof.

Then, to form the metal coating layer on the surface of the polymer-silicon composite particles having Pd catalyst deposited on the surface thereof through electroless plating, one of more metal particles selected from the above metal group, for example, Ni particles, are dispersed in water, plating is performed using nickel plating solution containing $NiSO_4$, $NaH_2PO_2$ and sodium citrate at a temperature in the range of 50 to 100° C. under slightly acid condition for several minutes, and then polymer-silicon composite particles plated with Ni are collected through centrifugation.

The metal coating layer formed through the aforementioned process may have a thickness in the range of 10 nm to 300 nm. Furthermore, the plating solution may have a concentration of 2 to 10 g(L).

The conductivity enhancement effect of the polymer-silicon composite particles according to the existence of the metal coating is insufficient when the metal coating layer has a thickness of less than 10 nm and energy density per weight of the polymer-silicon composite particles is reduced if the thickness of the metal coating layer is greater than 300 nm.

The polymer-silicon composite particles including the metal coating layer according to the present invention, formed through the above method, can be included along in an anode active material or included in the form of a mixture with crystalline carbon or amorphous carbon having a perfect layered crystal structure, such as natural graphite, in the anode active material.

The mixture of the crystalline or amorphous carbon and the polymer-silicon composite particles is advantageous since a charging/discharging power ratio required for its application can be designed according to the mixture ratio. Furthermore, the mixture is advantageous for measurement of fuel gauge and can achieve high calendar life.

The present invention mixes a conductive material and a binding agent with the anode active material to prepare slurry for forming an anode and coats the slurry on a current collector to form an anode. Furthermore, the present invention provides a lithium ion secondary battery that includes the anode and has a cathode, a separator, and a lithium salt containing non-aqueous electrolyte.

The polymer-silicon composite particles according to the present invention can solve problems caused by electrode thickness expansion and enable production of lithium ion secondary batteries having improved electrical conductivity.

The present invention will now be explained in more detail through examples. However, the present invention is not limited thereto.

EXAMPLE (1) Preparation of Silicon-Polymer Composite 60 g of styrene 60 g, 40 g of divinylbenzene, 20 g of carbon black, silicon powder (having the mean diameter of 2 µm), 100 g of cyclo-hexane, and 1 g of azobisisobutyronitrile were mixed to prepare a reaction mixture.

The mixture was put into aqueous dispersions, prepared by adding 500 Ml of sodium phosphate 0.1 molar solution and 75

Ml of sodium calcium 1 molar solution to 1 l of distilled water, homogenized using homogenizer, and then reacted while being stirred at 60° C. for one day.

After the reaction, hydrochloric acid was added to the reactor to adjust pH to 1 and the reactant was filtered using a filter. The filtered reactant was cleaned using distilled water and dried in a vacuum oven to obtain polymer-silicon composite particles. The mean diameter of the polymer-silicon composite particles was approximately 10 μm.

(2) Formation of Metal Coating Layer

50 Ml of mixed solution composed of 2 g of $PdCl_2$, 20 Ml of HCl and 1000 Ml of water was added to dispersions prepared by dispersing 5 g of the polymer-silicon composite particles in 100 Ml of water and reacted at the room temperature for five minutes. Upon the completion of reaction, the particles were separated through centrifugation. The separated particles were plated with nickel plating solution including 5 g/l of $NiSO_4$, 3 g/l of $NaH_2PO_2$ and 4 g/l of sodium citrate at 80° C. and pH=4.5 for ten minutes, and then polymer-silicon composite particles plated with Ni were collected through centrifugation.

(3) Production of Electrode 7.5 g of the obtained polymer-silicon composite particles, 1 g of carbon black, and 1.5 g of PVDF were mixed and NMP was added to the mixture as a solvent to prepare slurry.

The slurry was coated on 20 μm-thick Cu foil to 100 μm using matisse coater and then dried at 130° C. for 60 minutes to produce an electrode.

Comparative Example 1

An electrode was formed through the process according to the above Example of the present invention, excluding the step (2) of forming the metal coating layer.

Comparison Comparative Example 2

0.1 g of silicon particles (Aldrich, 325 mesh), 0.1025 g of copper sulfate pentahydrate ($CuSO_5.,5H_2O$, Kanto Chem) and 3 Ml of hydrofluoric acid were put into 97 μm of deionized water and stirred at the room temperature for 15 minutes. Upon the completion of reaction, the reactant was filtered using filter paper (Whatman, America) and dried in a vacuum oven at 120° C. for hours to obtain silicon particles having copper deposited thereon.

2.5 g of silicon powder obtained as above, 1.8 g of carbon black, 5.7 g of PVDF were mixed and NMP was added to the mixture as a solvent to prepare slurry.

An electrode was formed through the same process as the above Example.

Evaluation of Electrode Property
Production of Battery

Opposite poles were formed of Li and a separator composed of polypropylene/polyethylene/polypropylene (PP/PE/PP) was interposed between two electrodes, and then electrolyte prepared by dissolving 1 mole of lithiumhexafluorophosphate ($LiPF_6$) in mixed solution of ethylenecarbonate/propylenecarbonate/diethylcarbonate (EC/PC/DEC=30/20/50 wt %) was injected form a coil cell.

(2) Measurement of Electrode Thickness Variation after Charging\Discharging Cycle The cell manufactured as above was charged and discharged in the range of 0.005 to 1.5V at the rate of 0.5 C.

The charging/discharging cycle was repeated ten times, and then the cell was disassembled to take out the electrode of the cell. The electrode was cleaned with dimethylcarbonate three times and dried at the normal temperature, and then the thickness of the electrode was measured. The electrode thickness variation was calculated according to the following equation using the measurement value and shown in Table 1.

(electrode thickness variation) (%)=100×[(electrode thickness after ten charging/discharging cycles)−(initial electrode thickness)]/(initial electrode thickness)

TABLE 1

| | Electrode thickness variation (%) |
|---|---|
| Example | 20% |
| Comparative example 1 | 100% |
| Comparative example 2 | 30% |

(3) Measurement of Electrical Conductivity

Figure 3:
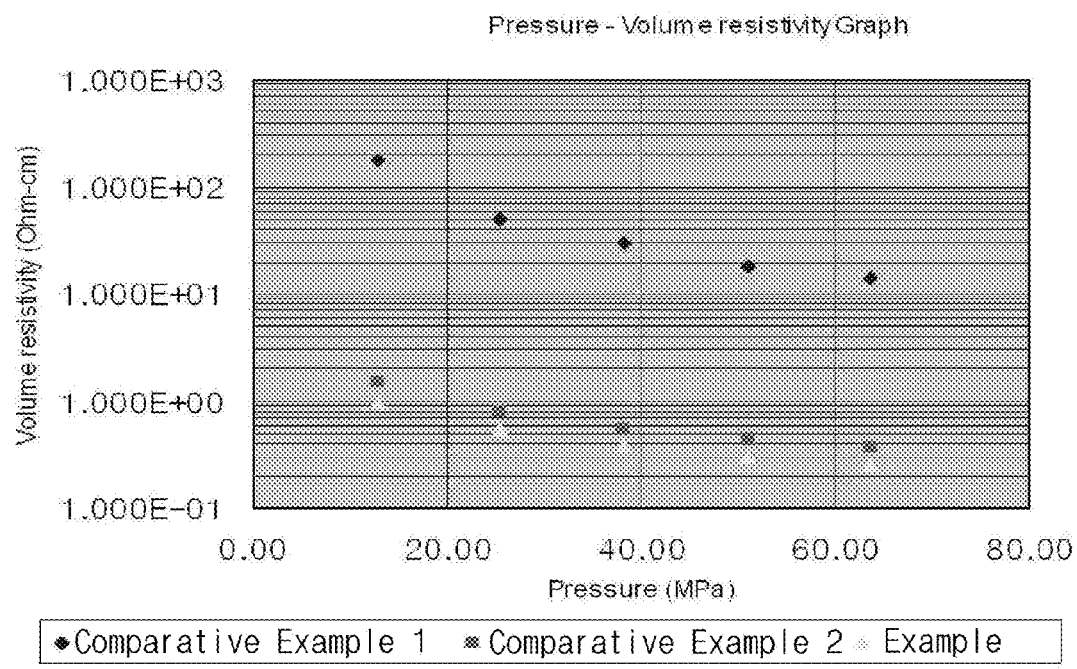
FIG. 3 is a graph showing electrical conductivity measured from an embodiment according to the present invention and comparison examples.

The electrical conductivities with respect to Example and the comparative examples were measured with powder resistivity measurement system (Loresta) and the measurement result was shown in FIG. 3.

While the present invention has been particularly shown in and described with reference to exemplary embodiments thereof, it will be understood by those of ordinary skill in the art that various changes in form and details may be made therein without departing the spirit and scope of the present invention as defined by the following claims.

The invention claimed is:

1. Polymer-silicon composite particles comprising silicon particles dispersed in a polymer matrix and a metal coating layer formed on the surface thereof;
   wherein the polymer matrix corresponds to one or more materials selected from the group consisting of polypyrrole, polyaniline and polythiophene,
   wherein the thickness of the metal coating layer is in the range of 10 to 300 nm.

2. The polymer-silicon composite particles of claim 1, wherein the polymer-silicon composite particles further comprises conductive fiber and carbon black.

3. The polymer-silicon composite particles of claim 2, wherein the conductive fiber is carbon nanotube.

4. The polymer-silicon composite particles of claim 1, wherein an organic silane compound is coupled to the surface of the silicon particles.

5. The polymer-silicon composite particles of claim 4, wherein the organic silane compound corresponds to at least one silane compound selected from the group consisting of dimethyldimethoxysilane, dimethyldiethoxysilane, methyltrimethoxysilane, vinyltrimethoxysilane, phenyltrimethoxysilane, and tetraethoxysilane.

6. The polymer-silicon composite particles of claim 1, wherein the metal coating layer is formed of at least one metal selected from the group consisting of Ni, Au, Ag, Cu, Zn, Cr, Al, Co, Sn, Pt and Pd.

7. An anode for lithium secondary batteries, which includes the polymer-silicon composite particles according to claim 1.

8. The anode for lithium secondary batteries of claim 7, further comprising amorphous carbon or crystalline carbon.

9. A lithium secondary battery comprising the anode according to claim 7.

* * * * *